C. HONOUR.
CAN CONTAINING AND POURING VESSEL.
APPLICATION FILED DEC. 8, 1910.

1,006,217.

Patented Oct. 17, 1911.

Witnesses
Hayward Woodard
John J. Schrott

Inventor
Charles Honour
By Fred G. Dieterich & Co.
Attorneys

UNITED STATES PATENT OFFICE.

CHARLES HONOUR, OF NEW WESTMINSTER, BRITISH COLUMBIA, CANADA.

CAN CONTAINING AND POURING VESSEL.

1,006,217.  Specification of Letters Patent.  Patented Oct. 17, 1911.

Application filed December 8, 1910. Serial No. 596,336.

*To all whom it may concern:*

Be it known that I, CHARLES HONOUR, citizen of the Dominion of Canada, residing at New Westminster, in the Province of British Columbia, Canada, have invented a new and useful Can Containing and Pouring Vessel, of which the following is a specification.

This invention relates to a containing vessel within which a can of condensed milk or cream or other liquid sealed in a can may be placed for use on the table, the containing vessel being provided with sealing valves by which the pouring and venting apertures in the can are sealed when not in use and with a handle and spout for convenience in pouring.

Figure 1:
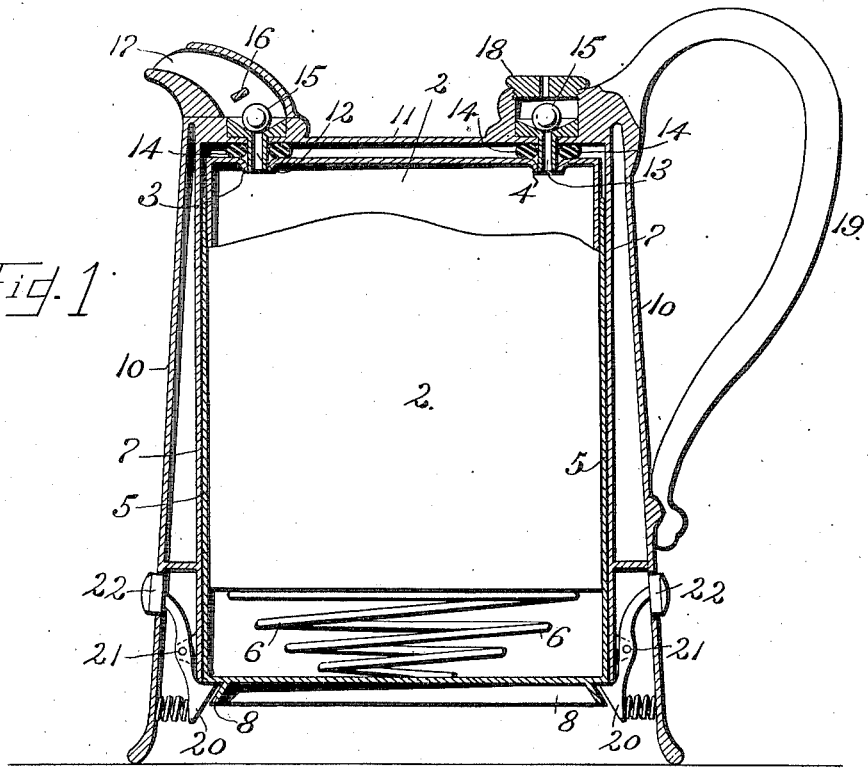
Figure 2:
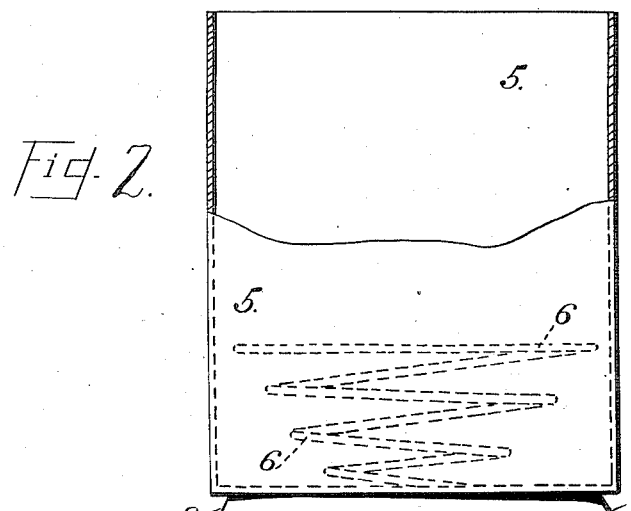

The invention is particularly described in the following specification, reference being made to the drawings by which it is accompanied, in which:

Figure 1 is a vertical section through the device with a can of milk inserted, and Fig. 2 is a detached view of the container within which the can is placed before insertion in the vessel.

In these drawings 2 represents the can of condensed milk, 3 and 4 being the pouring and venting apertures which must previously have been punched in the can at a fixed distance apart, for punching which a special device may be provided. This can 2 is inserted in a cylindrical primary container 5 conforming generally to the size of the can, and having an open upper end wherein it may be introduced and a closed lower end in which is a coiled spring 6 designed to exert a pressure upward against the can for a reason which will appear later. Toward the lower end this primary container 5 is provided with an annular notch 8 by which it is removably secured in its external casing or pouring vessel 10 in a manner to be described. This external casing or pouring vessel 10, which may be of any convenient form or dimension according to the taste of the designer or the size of the can for which it is intended to be used, has an inner lining 7 the dimension of which conforms to that of the inner container 5 and is open at the bottom and has a closed upper end 11. In this closed end 11 are secured small pouring and venting tubes 12 and 13 which project inward so as to enter the apertures 3 and 4 of an inserted can. Around each tube 12 and 13 and in contact with the top end 11 each tube is provided with a soft rubber ring 14 against which the top of the can, when inserted, is pressed upward by the spring 6 of the inner container. The upper side of these pouring and venting tubes 12 and 13 is furnished with a slightly conical seat on which balls 15 will normally lie to close the apertures through the tubes. One of these balls 15 is retained by checks 16 within a short pouring spout 17 and the other within a removable apertured venting guard 18, the position of the checks and the conical form of the seats being such as to allow the balls to readily fall off their seats when the vessel is tilted, as in the act of pouring, but will allow them to fall back onto and seal the apertures when the vessel is restored to a horizontal position as when placed upon the table.

Toward the lower side of the external vessel or casing 10 are pivotally mounted in the inside two spring latches 20 which are pivoted at 21 and on the end opposite to the latch are formed with plunger buttons 22 which pass through the outer wall of the vessel 10. These latches are designed to engage the angular notch 8 around the base of the inner container 5 and are released from such engagement by pressure on the buttons 22.

The vessel is provided with a handle 18 and spout 17 which with the body of the casing 10 are susceptible of ornamentation according to taste.

In use the can is pierced with the two apertures for pouring and venting, as is usual, though care must be taken that the distance apart and the size of the apertures are sufficient to permit the entrance of the tubes 12 and 13, for which piercing, as before explained, a simple puncturing device is provided. The can 2 is then placed in the inner or primary container 5 and is passed up into the casing 10 with the pierced apertures of the can in alinement with the tubes 12 and 13 in the upper end 11 of the casing, and is pressed up against the upper end against the resistance of the spring 6 in the bottom of the primary container until the latches 20 engage the annular notch 8 around the base of the container 5. The punched apertures of the can are thus sealed contact with the valve apertures in the top of the vessel and when the vessel is lifted and tilted, as in the act of pouring, both ball valves will fall off their seats and the fluid is free to flow from the can through the pouring tube 12 and spout 17 while the air is free to enter through the vent tube 13 to displace the volume of the fluid which flows out. On the vessel being restored to the horizontal position, as when placed upon the table, both the balls 15 of both the pouring and venting apertures fall back upon their seats and the apertures are hermetically sealed against the entrance of air or impurities, by which provision the contents of the can will not deteriorate.

A convenient can holder is thus provided for condensed milk or the like which effectually hides what many consider to be the unsightly appearance of a can and that has provision enabling the milk or cream to be poured from it and that immediately thereafter when the vessel is set down, closes the apertures by which that pouring is effected.

The device is readily accessible for cleaning and when a can has been emptied it can be quickly removed and replaced with a fresh one.

Having now particularly described my invention and the manner of its use, I hereby declare that what I claim as new and desire to be protected in by Letters Patent, is:

1. A receptacle for the purpose specified, said receptacle comprising an inner can holder having a closed bottom in which is a coiled spring and an annular latching notch, an external casing having a closed top and open bottom in which casing the inner holder is vertically slidable and having finger operated latches for engaging the annular notch ring of the inner can holder, tubes projecting downward from the closed top of the external casing designed to enter the pouring and venting apertures of an inserted can, ball valves in conical seats normally closing the upper ends of the pouring and venting tubes, a rubber ring around each pouring and venting tube sealing the connection between the tube and the can, a pouring spout connecting the pouring tube and a vented guard connected to the venting tube and a handle.

2. In a device of the character stated, an outer casing closed at the top and open at the bottom, a vent valve device in the top of said casing and a valved spout on the top of said casing, a cup telescoping into said casing, latch devices on said casing and operable from the outside of said casing for retaining said cup in position, a can held within said cup, said can having a vent opening and an out flow opening to register with the vent of said casing and the spout of said casing respectively, and means in said cup for pressing said can toward the top of said casing.

3. An apparatus of the class described, an outer double walled casing having a closed top and an open bottom, a cup telescoping into said casing, latches mounted on the inner wall of said casing between the inner and outer walls of said casing to retain said cup in position, the outer wall of said casing having openings through which said latches project, an outlet spout on the top of said casing, a spout nipple projecting through the top of said casing, a vent nipple projecting through the top of said casing, a can within said cup and having a pair of openings to receive said nipples, a packing around said nipples between the top of said can and the top of said casing, a spring within said cup for forcing said can against said packing and valves for closing said nipples when the device is in one position.

In testimony whereof I have signed my name to this specification in the presence of two subscribing witnesses.

CHARLES HONOUR.

Witnesses:
 ROWLAND BRITTAIN,
 WM. S. SOUTAR.